United States Patent Office 3,527,731
Patented Sept. 8, 1970

3,527,731
STABILIZED POLYAMIDES CONTAINING SOLUBLE COPPER AND A HALOGENATED METHANE DERIVATIVE
Antony E. Champ, Martinsville, N.J., assignor to Celanese Corporation, New York, N.Y., a corporation of Delaware
No Drawing. Continuation of application Ser. No. 502,519, Oct. 22, 1965. This application Oct. 28, 1968, Ser. No. 771,691
Int. Cl. G08g 51/58
U.S. Cl. 260—45.75
6 Claims

ABSTRACT OF THE DISCLOSURE

A method and composition for stabilizing synthetic linear polyamides against the degradation effects of heat, oxygen and atmospheric conditions utilizing iodo-, diiodo-, bromo- and dibromo-methanes and a copper compound soluble in the polyamide

---

This is a continuation of Ser. No. 502,519, filed Oct. 22, 1965, now abandoned.

This invention relates to synthetic linear polyamides which are stabilized against degradative effects of heat, oxygen and atmospheric conditions and to the manufacture of said polyamides.

Synthetic linear polyamides when exposed to the atmosphere at elevated temperatures for fairly long periods of time undergo degradation which impairs those physical properties responsible for the toughness, strength, and flexibility characteristics of such substances. In addition, these polyamides are badly discolored by exposure to atmospheric conditions, i.e. high energy radiation, heat and light. The resulting brittleness and discoloration are undesirable to certain applications such as electric insulation, transparent films, fibers, bristles, cloth, coated fabric and the like, wherein much dependence is placed upon maximum retention of toughness, strength, flexibility, original color and light fastness of dyes during fabrication and serivce.

Numerous stabilizers are known which are said to obviate the embrittlement of the polyamides at elevated temperatures in the presence of oxygen. As examples, satisfactory effects have been obtained by incorporating in the polyamide molecule copper salts (French Pat. 906,893, British Pat. 652,947); halogenides (German Pat. 5,350); certain acids of phosphorus (U.S. Pat. 2,510,-777); or mixtures of the substances named above (British Pat. 722,724, U.S. Pat. 2,705,227). It has been further suggested to incorporate organic heat stabilizers in the polyamide molecules, e.g. amines (Dutch Pat. 56,665), mercaptobenzimidazole (U.S. Pat. 2,630,421), or a combination of a copper salt and a hydrohalogenic acid salt of an aryl amine, aliphatic amine and the like (U.S. Pat. 2,960,489).

It is the object of this invention to provide a high molecular weight synthetic linear polyamide stabilized against degradative effects of heat, oxygen, and atmospheric conditions utilizing a unique class of stabilizers. It is a further object of the invention to provide a process for stabilizing high molecular weight synthetic linear polyamides against heat degradation or embrittlement that is encountered upon exposure for prolonged periods of time to elevated temperatures, particularly under atmospheric conditions. These and other objects will become apparent to those skilled in the art from the description of the specification and appended claims.

The objects of this invention are accomplished by incorporating into a synthetic linear polyamide, a stabilizer composition comprising a copper compound which is soluble in the polyamides and stability-enhancing compound of organic iodoform or bromoform compounds having the general formula:

$$(H)_{4-n}C(X)_n$$

wherein $n$ represents an integer of 1 or 2 and X represents iodine or bromine.

The synthetic linear polyamides which are utilized herein are well known in the art and can be prepared from polymerizable monoaminocarboxylic acids; their amide-forming derivatives, or from suitable diamines and suitable dicarboxylic acids or amide-forming derivatives of these compounds. The polyamides produced have recurring amide groups as an integral part of the main polymer chain, and the recurring intra-linear carbonamide groups in these polyamides are separated by hydrocarbon groups containing at least two carbon atoms. Synthetic linear polyamides which can be stabilized according to the process of this invention are all those of the nylon type having an intrinsic viscosity above 0.2, preferably above 0.4. Preparation of such polymers can be typically illustrated in U.S. Pats. 2,071,200; 2,071,253; 2,130,948; 2,285,009 and 2,512,606, among others. Particular polyamides included among these which can be stabilized by the stabilizers of this invention include among others, polyhexamethylene adipamide, polyhexamethylene sebacamide, polymerized 6-aminocaproic acid, polytetramethylene sebacamide, polytetramethyletne adipamide and polyadipamides prepared from di(4-aminocyclohexyl) ethane or 1,6-(4-aminocyclohexyl) hexane as the diamine component.

The time of addition of the stabilizer compositions to the polyamides is not necessarily critical. The stabilizer compositions as used herein are added preferably to the polyamide salt prior to the condensation reaction which is preferably carried out under known conditions in a pressure vessel, free of oxygen. These stabilizer compositions can be added to the reactants during the condensation reaction and the addition can also be made to the molten polymer after the condensation reaction is complete.

The manner of preparing the polyamides for the condensation reaction is well known in the art. A typical procedure which can be followed includes the addition of typical reactants such as hexamethylene diammonium adipate, and water in the presence of iodoform and cupric acetate to a pressure reactor vessel. The reaction solution is heated to approximately 120° C. allowing approximately one-quarter of the water to be distilled from the mixture. The reactor is then closed off and heated until a pressure of from 225–275 pounds per square inch was obtained. The desired pressure such as 250 p.s.i. was maintained by slight bleeding until the temperature of the mixture reached approximately 200 to 245° C. When the desired temperature was reached, all of the pressure was released slowly and nitrogen was bubbled through the melt for a sufficient period of time to obtain the desired intrinsic viscosity of the polymer product.

The copper which is employed in the stabilizing composition is present in the polyamide in dissolved form. The phrase "copper in dissolved polyamide" is defined as a copper compound which is dissolved in polyamide, i.e. is distributed uniformly throughout the polyamide. The mechanism whereby copper becomes dissolved in polyamides may vary; for example, by milling metallic copper into a polyamide, a reaction occurs with the polyamide whereby a soluble copper compound is formed. Thus, while "dissolved copper" does not include elementary copper, it does include soluble copper derived therefrom. Also, inorganic and organic copper compounds yield complexes with diamines and/or polyamides.

The soluble copper compounds which can be utilized include the cuprous and cupric salts of an organic or inorganic acid and also the copper compounds which are formed when metallic copper and copper oxides are added in stabilizing quantities to the polyamide or to the polyamide-forming reactants. The preferred compounds are the copper salts of alkanoic acids such as copper acetate, copper propionate, copper butyrate, copper stearate, copper lactate, preferably those alkanoic acids having up to 6 carbon atoms. Other suitable copper compounds include, among others, copper benzoate, cupric chloride, cupric bromide, cupric sulfate, cupric nitrate, ammonium complexes of the above-described salts, etc. The amount of dissolved copper compound, expressed in terms of percent of metallic copper by weight of polyamide, can range from about .0005 to about 0.5 percent, preferably in the range from about .001 to about 0.05 percent.

Another portion of the stabilizer compositions can be described as compounds having the general formula:

$$(H)_{4-n}C(X)_n$$

wherein $n$ represents an integer of 1 and 2 and X represents iodine or bromine. The compounds falling within this formula are iodomethane and diiodomethane. The amount of the stabilizer compound which can be used in the polyamide is used in stabilizing quantities and can range from about 0.05 to about 5 weight percent, preferably 0.10 to 2 weight percent based on the polyamide.

The compositions of this invention may be modified by the addition of other materials. Suitable modifying agents include plasticizers, resins, waxes, fillers and certain pigments. The form and use of the polyamide will determine which of these modifying agents are the more suitable.

The improved polyamides of this invention can be converted into any of the forms suitable for polyamides, generally, such as fibers, yarns, tire cord, bristles, fabric, molded articles, films, and coatings, for example, for filaments textiles, wood, rubber, leather and ceramic materials, and are particularly useful in the above forms when intended to be exposed to elevated temperatures. Thus, they form especially valuable textile fabrics by reason of their stability toward the high temperatures encountered in laundering, calendering, and ironing operations. By reason of their excellent durability, the compositions of the invention are especially useful, also, for electrical insulation, for example, as coating for magnet wires, electric blasting cap leading wires, and slot insulation for motors, movie film, sausage casing and as coatings on materials which are exposed to elevated temperatures.

The following example will serve to illustrate the process of the invention without limiting the same:

EXAMPLE 1

Into a small pipe autoclave was charged a solution containing 55 grams of hexamethylene diammonium adipate, 0.0078 gram of cupric acetate, and 55 milliliters of water. To this was added 0.125 gram of iodomethane in 5 milliliters of benzene (0.25 percent iodomethane 50 parts per million copper based on final polymer weight). The autoclave was flushed with nitrogen, then heated to about 115° C. 45 milliliters of water (including 5 milliliters of benzene) were removed. The autoclave was then sealed and heated to a temperature of 250° C. and a pressure of about 160 pounds per square inch. The pressure was slowly released until atmospheric pressure was obtained.

The material was then at 270° C., nitrogen was blown over the melt for 15 minutes, then a vacuum of about 15 millimeters applied for ¾ hour. At the end of this period, the reactor was closed, pressured to 50 pounds per square inch and the resultant polymer extruded through an appropriate valve in the base of the autoclave. The polymer had a relative viscosity of 2.0.

The polymer thus obtained in the form of wire was exposed at 150° C. in an air oven. This material was flexible after 200 hours exposure, whereas unstabilized polyhexamethylene adipamide became brittle after 65 hours.

In a similar manner and with similar results as described in Example 1, diiodomethane, or bromomethane is substituted for iodomethane. Furthermore, similar results are obtained as well with polyamides such as polyhexamethylene sebacamide, polymerized 6-aminocaproic acid, polytetramethylene sebacamide and polytetramethylene adipamide stabilized with iodomethane, diiodomethane and bromomethane.

It is to be understood that the foregoing description is merely illustrative of preferred embodiments of the invention of which many variations may be made by those skilled in the art within the scope of the following claims without departing from the spirit thereof.

What is claimed is:

1. A synthetic linear polyamide which is stabilized against degradative effects of heat, oxygen, and atmospheric conditions having incorporated stabilizing amounts of copper dissolved in said polyamide and a stability-enhancing compound having the formula:

$$(H)_{4-n}C(X)_n$$

wherein $n$ represents an integer of 1 or 2 and X represents a member of the group selected from iodine and bromine.

2. The synthetic linear polyamide of claim 1 wherein 0.0005 to about 0.5 percent by weight of copper dissolved in said polyamide and about 0.05 to about 5 percent of a stability-enhancing compound having the formula:

$$(H)_{4-n}C(X)_n$$

wherein $n$ represents an integer of 1 or 2 and X represents a member of the group selected from iodine and bromine.

3. The synthetic linear polyamide of claim 1 wherein the amount of copper dissolved in said polyamide ranges from about 0.001 to about 0.05 percent by weight and the amount of the stabilizing-enhancing compound ranges from about 0.10 to about 2 percent by weight.

4. The product of claim 3 wherein the stabilizing-enhancing compound is iodomethane.

5. The product of claim 3 wherein the stabilizing-enhancing compound is diiodomethane.

6. The product of claim 3 wherein the synthetic linear polyamide is polyhexamethylene adipamide.

References Cited

UNITED STATES PATENTS 2,705,227    3/1965    Stamatoff _____ 260—45.75

FOREIGN PATENTS

38/16,770    9/1963    Japan.

DONALD E. CZAJA, Primary Examiner

V. P. HOKE, Assistant Examiner

U.S. Cl. X.R.

260—45.7